United States Patent
Burgess

(10) Patent No.: US 12,204,458 B1
(45) Date of Patent: Jan. 21, 2025

(54) TRANSLATION LOOKASIDE BUFFER PROBING PREVENTION

(71) Applicant: SiFive, Inc., San Mateo, CA (US)

(72) Inventor: Bradley Gene Burgess, Sunset Valley, TX (US)

(73) Assignee: SiFive, Inc., Santa Clara, CA (US)

(*) Notice: Subject to any disclaimer, the term of this patent is extended or adjusted under 35 U.S.C. 154(b) by 18 days.

(21) Appl. No.: 18/344,951

(22) Filed: Jun. 30, 2023

(51) Int. Cl.
*G06F 12/1027* (2016.01)
*G06F 12/1009* (2016.01)

(52) U.S. Cl.
CPC ...... *G06F 12/1027* (2013.01); *G06F 12/1009* (2013.01)

(58) Field of Classification Search
CPC .......................... G06F 12/1027; G06F 12/1009
USPC ......................................................... 711/118
See application file for complete search history.

(56) References Cited

U.S. PATENT DOCUMENTS

| 10,929,301 B1* | 2/2021 | Ramesh | G06F 9/45558 |
| 2017/0091113 A1* | 3/2017 | Waugh | G06F 12/1027 |
| 2018/0246815 A1* | 8/2018 | Smith | G06F 12/1009 |
| 2023/0176979 A1* | 6/2023 | Shulyak | G06F 12/1036 |
| | | | 711/205 |

* cited by examiner

*Primary Examiner* — Prasith Thammavong
*Assistant Examiner* — Sidney Li
(74) *Attorney, Agent, or Firm* — Kilpatrick Townsend & Stockton LLP

(57) ABSTRACT

Described are methods, logic, and circuitry which prevent translation lookaside buffer probing. Reporting a privilege violation fault is delayed for a defined period of time. The defined period of time can be a time frame needed to perform a long page table walk, which can be at least hundreds of clock cycles. A counter or a forced page table walk corresponding to the defined period of time can be used to implement the delay.

20 Claims, 6 Drawing Sheets

TRANSLATION LOOKASIDE BUFFER PROBING PREVENTION

TECHNICAL FIELD

This disclosure relates generally to integrated circuits and, more specifically, to a method for preventing translation lookaside buffer probing.

BACKGROUND

A central processing unit (CPU) or processor core may be implemented according to a particular microarchitecture. As used herein, a "microarchitecture" refers to the way an instruction set architecture (ISA) (e.g., the RISC-V instruction set) is implemented by a processor core. A microarchitecture may be implemented by various components, such as decode units, rename units, dispatch units, execution units, registers, caches, queues, data paths, translation lookaside buffers (TLBs), and/or other logic associated with instruction flow. A processor core may execute instructions in a pipeline based on the microarchitecture that is implemented.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
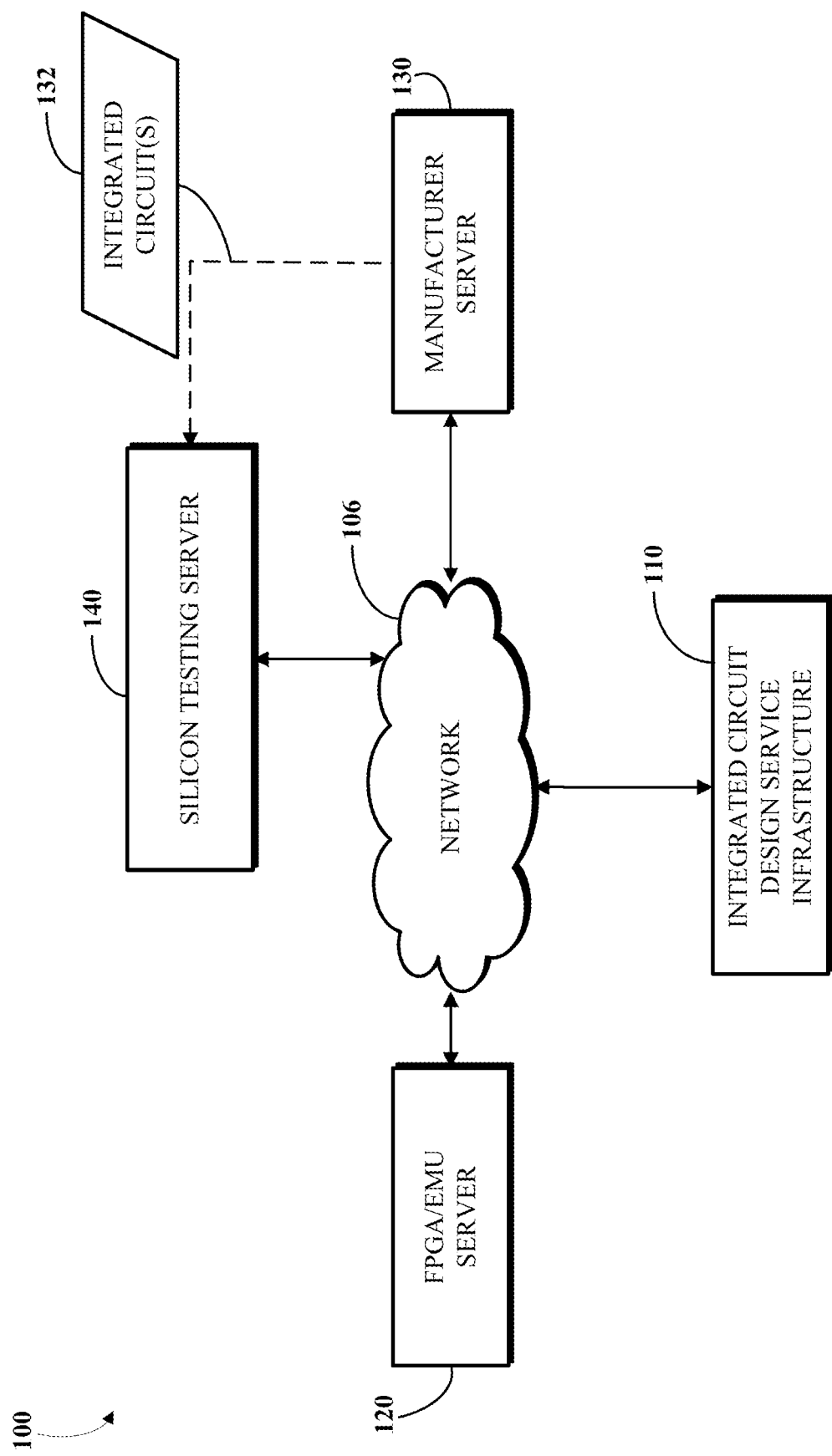
FIG. 1 is a block diagram of an example of a system for facilitating generation and manufacture of integrated circuits.

A processor or processor core may execute instructions in a pipeline based on the microarchitecture that is implemented. The pipeline may be implemented by various components, such as decode units, rename units, dispatch units, execution units, registers, caches, queues, data paths, translation lookaside buffers (TLBs), and/or other logic associated with instruction flow. The processor may execute instructions out-of-order or be an on out-of-order processor. TLBs are memory caches that store the recent translations of virtual memory to physical memory.

Certain sections or types of code (referred to herein as "privileged code") are stored in memory at addresses that are not meant to be known by external applications, for example, for security and other reasons. These memory addresses or locations are marked as privileged (referred to herein as "privileged memory address"). An attempt (via an execution of an instruction) to access these locations results in the processor returning a fault based on a privilege violation (a "privilege violation fault"). Various techniques are used to hide the location of the privileged code. With respect to the kernel, Kernel Address Space Layout Randomization may be used at reset or boot-up to locate itself randomly in memory and hide its location from attackers. Another method may use a bit to indicate whether a memory request or memory access request is to an upper portion of the memory or to a lower portion of the memory. In this instance, one of the upper portion or the lower portion is marked as privileged. If the memory request is to the portion that is privilege, an immediate privilege violation fault is sent.

Hackers or attackers want to obtain access to the privileged code to obtain control of the processor. A method used by the hackers to circumvent hiding of the privileged code is to probe pages of memory and time how long it takes to get a privilege violation fault. If the privilege violation fault is returned quickly, then the page the hacker was attempting to access was likely in the TLB. Since the kernel is more or less always in a TLB, then the location of the page may indicate the location of the kernel, for example. This may allow the hacker to eventually get access to some portions of the privileged code.

Described are methods, logic, and circuitry which prevent translation lookaside buffer probing. The methods, logic, and circuitry result in reporting a privilege violation fault in the same time frame or in a time frame as needed to perform or associated with performing a long page table walk in the event of a TLB miss, a page default, and/or combinations thereof. That is, reporting of the privilege violation fault is delayed for a length of time associated with a long page table walk (referred to herein as a "page table walk latency"). This obfuscates a real processing time associated with a memory request leading to or resulting in the privilege violation fault. As a result, attackers are not provided any timing information with which to determine if the memory request may hint to where privileged code may reside in memory. In implementations, there is a magnitude of order difference between a short page table walk and a long page table walk. The short page table walk may be 4 clock cycles whereas the long page table walk may be 100s or 1000s of clock cycles. In implementations, a value of the page table walk latency is at least hundreds of clock cycles. In implementations, a value of the page table walk latency is at least thousands of clock cycles. In implementations, a value of the page table walk latency is a non-zero value of clock cycles.

In implementations, a counter or timer may be used to countdown the page table walk latency for a privilege violation fault. This is, in effect, a simulated page table walk. A probe or memory request may initiate memory access processing and start the counter. Fault circuitry associated with TLBs may determine that the probe or memory request is to a privileged memory address and mark or indicate the memory request as a privilege violation fault. Upon completion of the counter or timer, the fault circuitry or operating system may report the privilege violation fault. In this fashion, each privilege violation fault has substantially at least a page table walk latency reporting interval. In implementations, a value in the counter may be defined. In implementations, the value in the counter may be updated based on a page table walk longer than a stored value. In implementations, a pseudo-random perturbation may be added to the count value to slightly report different intervals.

In implementations, fault circuitry associated with TLBs may determine that a probe or memory request is to a privileged memory address and mark or indicate it as a privilege violation fault. The fault circuitry may then treat the privilege violation fault as a TLB miss and force a long page table walk to a memory address stored in a register. In implementations, this is applicable to TLB hits or TLB misses. In the event of a true TLB miss, the fault circuitry may check whether the page table walk resulting from the TLB miss meets or exceeds a page table walk latency value stored in a register before initiating a forced long page table walk. Additional time may need to be waited if the page table walk latency value is not met. In implementations, the register with the latency count may be updated with a new latency count if the page table walk latency associated with the true TLB miss is longer than the page table walk latency of the latency count stored in the register.

To describe some implementations in greater detail, reference is first made to examples of hardware and software structures used to implement a system including components that may facilitate TLB probe prevention. FIG. 1 is a block diagram of an example of a system 100 for generation and manufacture of integrated circuits. The system 100 includes a network 106, an integrated circuit design service infrastructure 110 (e.g., integrated circuit generator), a field programmable gate array (FPGA)/emulator server 120, and a manufacturer server 130. For example, a user may utilize a web client or a scripting application program interface (API) client to command the integrated circuit design service infrastructure 110 to automatically generate an integrated circuit design based on a set of design parameter values selected by the user for one or more template integrated circuit designs. In some implementations, the integrated circuit design service infrastructure 110 may be configured to generate an integrated circuit design like the integrated circuit design shown and described in FIGS. 3 and 4. The system 100 and each component in the system 100 is illustrative and can include additional, fewer, or different components which may be similarly or differently architected without departing from the scope of the specification and claims herein. Moreover, the illustrated components can perform other functions without departing from the scope of the specification and claims herein.

The integrated circuit design service infrastructure 110 may include a register-transfer level (RTL) service module configured to generate an RTL data structure for the integrated circuit based on a design parameters data structure. For example, the RTL service module may be implemented as Scala code. For example, the RTL service module may be implemented using Chisel. For example, the RTL service module may be implemented using flexible intermediate representation for register-transfer level (FIRRTL) and/or a FIRRTL compiler. For example, the RTL service module may be implemented using Diplomacy. For example, the RTL service module may enable a well-designed chip to be automatically developed from a high level set of configuration settings using a mix of Diplomacy, Chisel, and FIRRTL. The RTL service module may take the design parameters data structure (e.g., a java script object notation (JSON) file) as input and output an RTL data structure (e.g., a Verilog file) for the chip.

In some implementations, the integrated circuit design service infrastructure 110 may invoke (e.g., via network communications over the network 106) testing of the resulting design that is performed by the FPGA/emulation server 120 that is running one or more FPGAs or other types of hardware or software emulators. For example, the integrated circuit design service infrastructure 110 may invoke a test using a field programmable gate array, programmed based on a field programmable gate array emulation data structure, to obtain an emulation result. The field programmable gate array may be operating on the FPGA/emulation server 120, which may be a cloud server. Test results may be returned by the FPGA/emulation server 120 to the integrated circuit design service infrastructure 110 and relayed in a useful format to the user (e.g., via a web client or a scripting API client).

The integrated circuit design service infrastructure 110 may also facilitate the manufacture of integrated circuits using the integrated circuit design in a manufacturing facility associated with the manufacturer server 130. In some implementations, a physical design specification (e.g., a graphic data system (GDS) file, such as a GDSII file) based on a physical design data structure for the integrated circuit is transmitted to the manufacturer server 130 to invoke manufacturing of the integrated circuit (e.g., using manufacturing equipment of the associated manufacturer). For example, the manufacturer server 130 may host a foundry tape-out website that is configured to receive physical design specifications (e.g., such as a GDSII file or an open artwork system interchange standard (OASIS) file) to schedule or otherwise facilitate fabrication of integrated circuits. In some implementations, the integrated circuit design service infrastructure 110 supports multi-tenancy to allow multiple integrated circuit designs (e.g., from one or more users) to share fixed costs of manufacturing (e.g., reticle/mask generation, and/or shuttles wafer tests). For example, the integrated circuit design service infrastructure 110 may use a fixed package (e.g., a quasi-standardized packaging) that is defined to reduce fixed costs and facilitate sharing of reticle/mask, wafer test, and other fixed manufacturing costs. For example, the physical design specification may include one or more physical designs from one or more respective physical design data structures in order to facilitate multi-tenancy manufacturing.

In response to the transmission of the physical design specification, the manufacturer associated with the manufacturer server 130 may fabricate and/or test integrated circuits based on the integrated circuit design. For example, the associated manufacturer (e.g., a foundry) may perform optical proximity correction (OPC) and similar post-tape-out/pre-production processing, fabricate the integrated circuit(s) 132, update the integrated circuit design service infrastructure 110 (e.g., via communications with a controller or a web application server) periodically or asynchronously on the status of the manufacturing process, perform appropriate testing (e.g., wafer testing), and send to a packaging house for packaging. A packaging house may receive the finished wafers or dice from the manufacturer and test materials and update the integrated circuit design service infrastructure 110 on the status of the packaging and delivery process periodically or asynchronously. In some implementations, status updates may be relayed to the user when the user checks in using the web interface, and/or the controller might email the user that updates are available.

In some implementations, the resulting integrated circuit(s) 132 (e.g., physical chips) are delivered (e.g., via mail) to a silicon testing service provider associated with a silicon testing server 140. In some implementations, the resulting integrated circuit(s) 132 (e.g., physical chips) are installed in a system controlled by the silicon testing server 140 (e.g., a cloud server), making them quickly accessible to be run and tested remotely using network communications to control the operation of the integrated circuit(s) 132. For example, a login to the silicon testing server 140 controlling a manufactured integrated circuit(s) 132 may be sent to the integrated circuit design service infrastructure 110 and relayed to a user (e.g., via a web client). For example, the integrated circuit design service infrastructure 110 may be used to control testing of one or more integrated circuit(s) 132.

Figure 2:
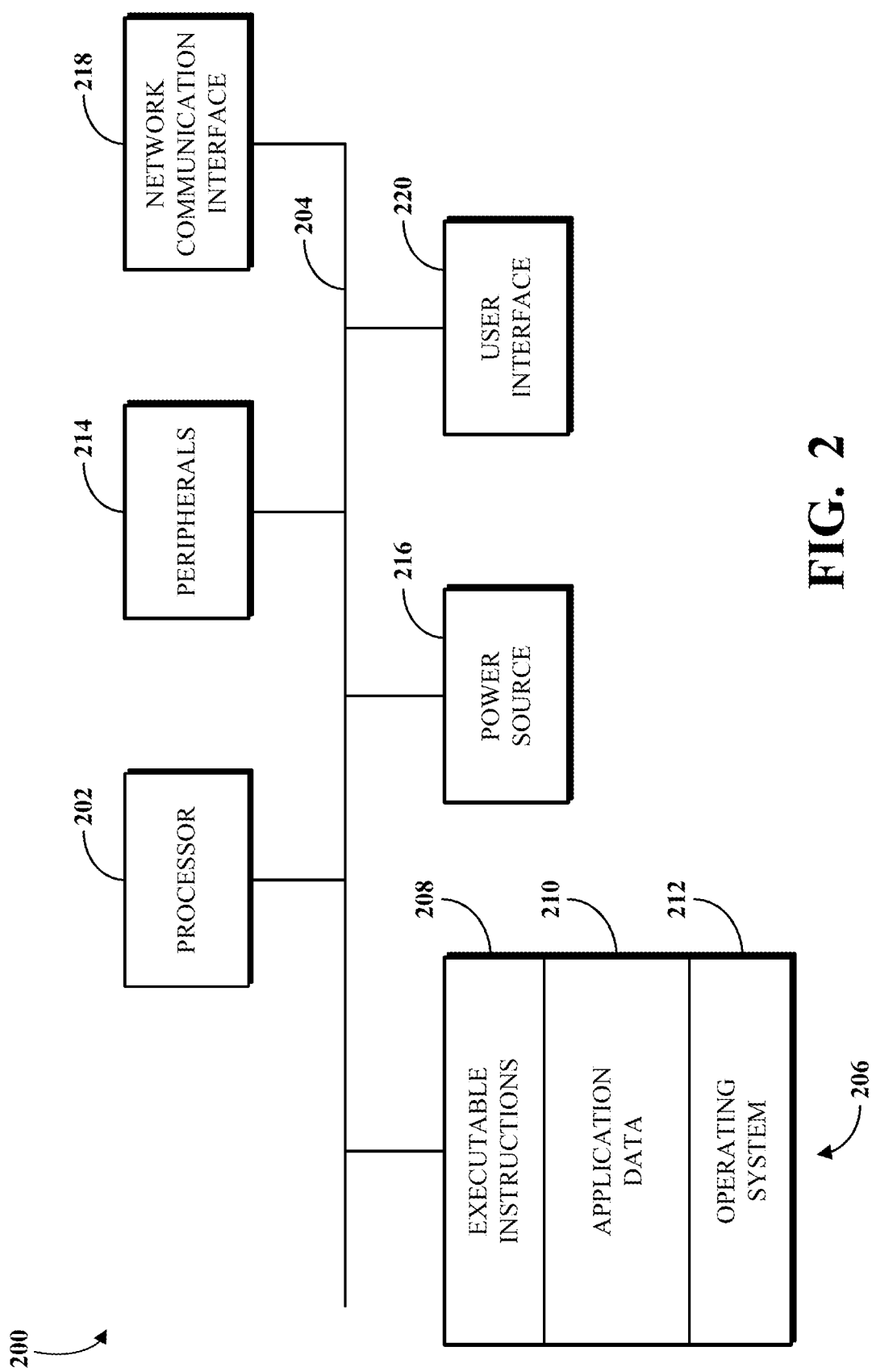
FIG. 2 is a block diagram of an example of a system for facilitating generation of a circuit representation.

FIG. 2 is a block diagram of an example of a system 200 for facilitating generation of integrated circuits, for facilitating generation of a circuit representation for an integrated circuit, and/or for programming or manufacturing an integrated circuit. The system 200 is an example of an internal configuration of a computing device. The system 200 may be used to implement the integrated circuit design service infrastructure 110, and/or to generate a file that generates a circuit representation of an integrated circuit design like the integrated circuit design shown and described in FIGS. 3 and 4. The system 200 and each component in the system 200 is illustrative and can include additional, fewer, or different components which may be similarly or differently architected without departing from the scope of the specification and claims herein. Moreover, the illustrated components can perform other functions without departing from the scope of the specification and claims herein.

The processor 202 can be a central processing unit (CPU), such as a microprocessor, and can include single or multiple processors having single or multiple processing cores. Alternatively, the processor 202 can include another type of device, or multiple devices, now existing or hereafter developed, capable of manipulating or processing information. For example, the processor 202 can include multiple processors interconnected in any manner, including hardwired or networked, including wirelessly networked. In some implementations, the operations of the processor 202 can be distributed across multiple physical devices or units that can be coupled directly or across a local area or other suitable type of network. In some implementations, the processor 202 can include a cache, or cache memory, for local storage of operating data or instructions.

The memory 206 can include volatile memory, non-volatile memory, or a combination thereof. For example, the memory 206 can include volatile memory, such as one or more dynamic random access memory (DRAM) modules such as double data rate (DDR) synchronous DRAM (SDRAM), and non-volatile memory, such as a disk drive, a solid-state drive, flash memory, Phase-Change Memory (PCM), or any form of non-volatile memory capable of persistent electronic information storage, such as in the absence of an active power supply. The memory 206 can include another type of device, or multiple devices, now existing or hereafter developed, capable of storing data or instructions for processing by the processor 202. The processor 202 can access or manipulate data in the memory 206 via the bus 204. Although shown as a single block in FIG. 2, the memory 206 can be implemented as multiple units. For example, a system 200 can include volatile memory, such as random access memory (RAM), and persistent memory, such as a hard drive or other storage.

The memory 206 can include executable instructions 208, data, such as application data 210, an operating system 212, or a combination thereof, for immediate access by the processor 202. The executable instructions 208 can include, for example, one or more application programs, which can be loaded or copied, in whole or in part, from non-volatile memory to volatile memory to be executed by the processor 202. The executable instructions 208 can be organized into programmable modules or algorithms, functional programs, codes, code segments, or combinations thereof to perform various functions described herein. For example, the executable instructions 208 can include instructions executable by the processor 202 to cause the system 200 to automatically, in response to a command, generate an integrated circuit design and associated test results based on a design parameters data structure. The application data 210 can include, for example, user files, database catalogs or dictionaries, configuration information or functional programs, such as a web browser, a web server, a database server, or a combination thereof. The operating system 212 can be, for example, Microsoft Windows®, macOS®, or Linux®; an operating system for a small device, such as a smartphone or tablet device; or an operating system for a large device, such as a mainframe computer. The memory 206 can comprise one or more devices and can utilize one or more types of storage, such as solid-state or magnetic storage.

The peripherals 214 can be coupled to the processor 202 via the bus 204. The peripherals 214 can be sensors or detectors, or devices containing any number of sensors or detectors, which can monitor the system 200 itself or the environment around the system 200. For example, a system 200 can contain a temperature sensor for measuring temperatures of components of the system 200, such as the processor 202. Other sensors or detectors can be used with the system 200, as can be contemplated. In some implementations, the power source 216 can be a battery, and the system 200 can operate independently of an external power distribution system. Any of the components of the system 200, such as the peripherals 214 or the power source 216, can communicate with the processor 202 via the bus 204.

The network communication interface 218 can also be coupled to the processor 202 via the bus 204. In some implementations, the network communication interface 218 can comprise one or more transceivers. The network communication interface 218 can, for example, provide a connection or link to a network, such as the network 106 shown in FIG. 1, via a network interface, which can be a wired network interface, such as Ethernet, or a wireless network interface. For example, the system 200 can communicate with other devices via the network communication interface 218 and the network interface using one or more network protocols, such as Ethernet, transmission control protocol (TCP), Internet protocol (IP), power line communication (PLC), Wi-Fi, infrared, general packet radio service (GPRS), global system for mobile communications (GSM), code division multiple access (CDMA), or other suitable protocols.

A user interface 220 can include a display; a positional input device, such as a mouse, touchpad, touchscreen, or the like; a keyboard; or other suitable human or machine interface devices. The user interface 220 can be coupled to the processor 202 via the bus 204. Other interface devices that permit a user to program or otherwise use the system 200 can be provided in addition to or as an alternative to a display. In some implementations, the user interface 220 can include a display, which can be a liquid crystal display (LCD), a cathode-ray tube (CRT), a light emitting diode (LED) display (e.g., an organic light emitting diode (OLED) display), or other suitable display. In some implementations, a client or server can omit the peripherals 214. The operations of the processor 202 can be distributed across multiple clients or servers, which can be coupled directly or across a local area or other suitable type of network. The memory 206 can be distributed across multiple clients or servers, such as network-based memory or memory in multiple clients or servers performing the operations of clients or servers. Although depicted here as a single bus, the bus 204 can be composed of multiple buses, which can be connected to one another through various bridges, controllers, or adapters.

A non-transitory computer readable medium may store a circuit representation that, when processed by a computer, is used to program or manufacture an integrated circuit. For example, the circuit representation may describe the integrated circuit specified using a computer readable syntax. The computer readable syntax may specify the structure or function of the integrated circuit or a combination thereof. In some implementations, the circuit representation may take the form of a hardware description language (HDL) program, a register-transfer level (RTL) data structure, a flexible intermediate representation for register-transfer level (FIRRTL) data structure, a Graphic Design System II (GDSII) data structure, a netlist, or a combination thereof. In some implementations, the integrated circuit may take the form of a field programmable gate array (FPGA), application specific integrated circuit (ASIC), system-on-a-chip (SoC), or some combination thereof. A computer may process the circuit representation in order to program or manufacture an integrated circuit, which may include programming a field programmable gate array (FPGA) or manufacturing an application specific integrated circuit (ASIC) or a system on a chip (SoC). In some implementations, the circuit representation may comprise a file that, when processed by a computer, may generate a new description of the integrated circuit. For example, the circuit representation could be written in a language such as Chisel, an HDL embedded in Scala, a statically typed general purpose programming language that supports both object-oriented programming and functional programming.

In an example, a circuit representation may be a Chisel language program which may be executed by the computer to produce a circuit representation expressed in a FIRRTL data structure. In some implementations, a design flow of processing steps may be utilized to process the circuit representation into one or more intermediate circuit representations followed by a final circuit representation which is then used to program or manufacture an integrated circuit. In one example, a circuit representation in the form of a Chisel program may be stored on a non-transitory computer readable medium and may be processed by a computer to produce a FIRRTL circuit representation. The FIRRTL circuit representation may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit.

In another example, a circuit representation in the form of Verilog or VHDL may be stored on a non-transitory computer readable medium and may be processed by a computer to produce an RTL circuit representation. The RTL circuit representation may be processed by the computer to produce a netlist circuit representation. The netlist circuit representation may be processed by the computer to produce a GDSII circuit representation. The GDSII circuit representation may be processed by the computer to produce the integrated circuit. The foregoing steps may be executed by the same computer, different computers, or some combination thereof, depending on the implementation.

Figure 3:
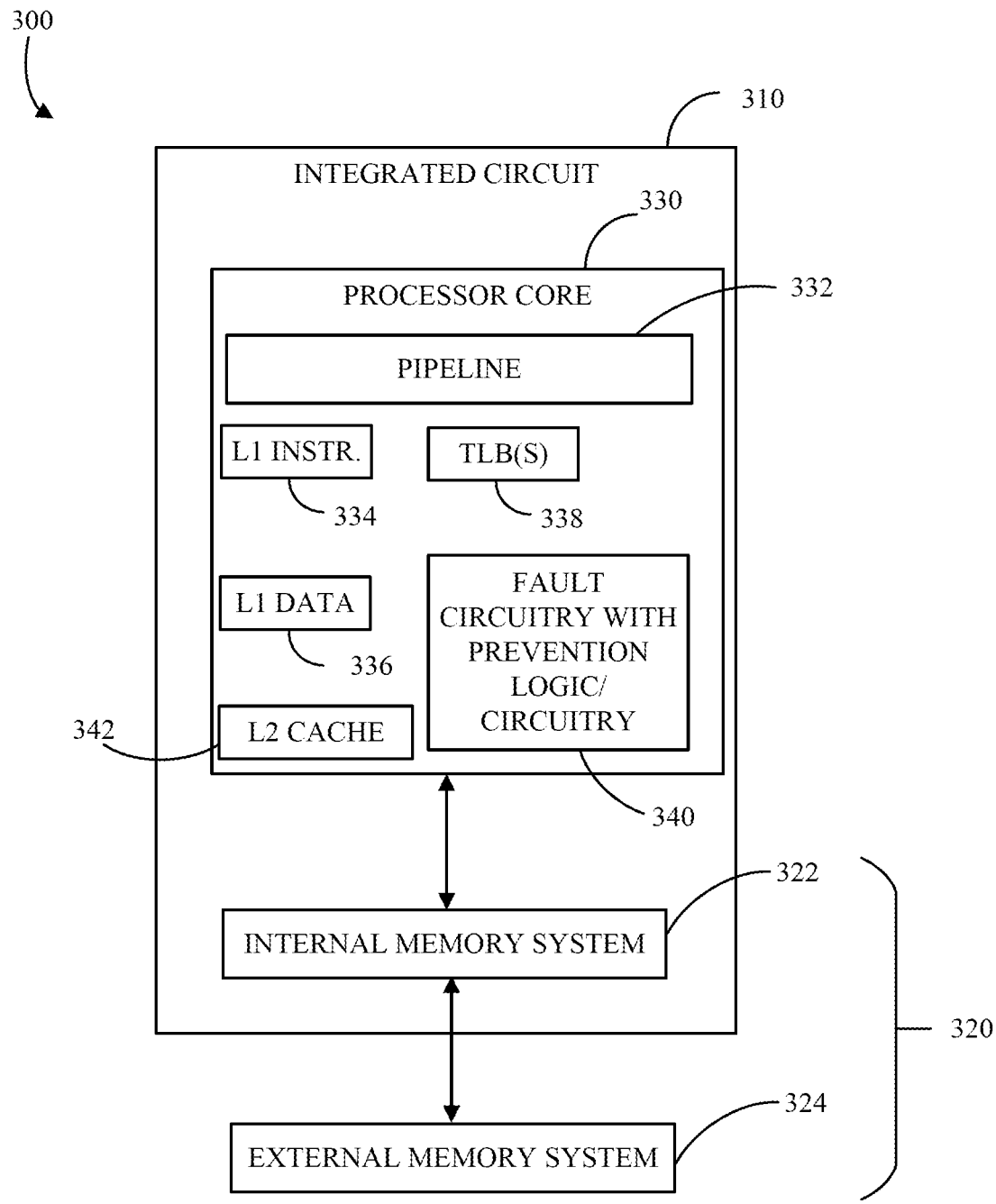
FIG. 3 is a block diagram of an example of an integrated circuit which includes fault circuitry with prevention logic and/or circuitry.

FIG. 3 is a block diagram of an example of a system 300 including an integrated circuit 310 and a memory system 320. The integrated circuit 310 may include a processor core 330. The integrated circuit 310 could be implemented, for example, as a field-programmable gate array (FPGA), an application-specific integrated circuit (ASIC), or a system-on-chip (SoC). The memory system 320 may include an internal memory system 322 and an external memory system 324. The internal memory system 322 may be in communication with the external memory system 324. The internal memory system 322 may be internal to the integrated circuit 310 (e.g., implemented by the FPGA, the ASIC, or the SoC). The external memory system 324 may be external to integrated circuit 310 (e.g., not implemented by the FPGA, the ASIC, or the SoC). The internal memory system 322 may include, for example, a controller and memory, such as random access memory (RAM), static random access memory (SRAM), cache, and/or a cache controller, such as a level three (L3) cache and an L3 cache controller. The external memory system 324 may include, for example, a controller and memory, such as dynamic random access memory (DRAM) and a memory controller. In some implementations, the memory system 320 may include memory mapped inputs and outputs (MMIO), and may be connected to non-volatile memory, such as a disk drive, a solid-state drive, flash memory, and/or phase-change memory (PCM).

The processor core 330 may include circuitry for executing instructions, such as one or more pipelines 332, a level one (L1) instruction cache 334, an L1 data cache 336, one or more TLB(s) 338, fault circuitry with prevention logic and/or circuitry 340, and a level two (L2) cache 342 that may be a shared cache. The processor core 330 may fetch and execute instructions in the one or more pipelines 332, for example, as part of a program sequence. The instructions may cause memory requests or memory access requests (e.g., read requests and/or write requests) that the one or more pipelines 332 may transmit to the L1 instruction cache 334, the L1 data cache 336, the TLB(s) 338 and/or the L2 cache 342. In implementations, the fault circuitry with prevention logic and/or circuitry 340 may determine that a memory request being processed by the processor core 330 is attempting to access a privileged memory address. In lieu of sending a privileged memory violation as soon as possible, the fault circuitry with prevention logic and/or circuitry 340 may initiate a process to delay or wait at least a page table walk latency period or interval to report the privileged memory violation. In implementations, the fault circuitry with prevention logic and/or circuitry 340 may use a forced page table walk, a counter or timer, and/or combinations thereof to implement the delay.

In implementations, the prevention logic and/or circuitry in the fault circuitry with prevention logic and/or circuitry 340 may include or be a counter or timer which may be used to countdown the page table walk latency for the memory request that has been identified or marked as a privilege violation fault. Upon completion or expiration of the counter or timer, the fault circuitry with prevention logic and/or circuitry 340 or operating system may then report the privilege violation fault. In implementations, a value in the counter may be defined based on historical data. In implementations, a value in the counter may be configurable. In implementations, the value in the counter may be updated based on page table walks that are longer than the stored value. In implementations, a pseudo-random perturbation may be added to the value to add slight variations to the reporting intervals.

In implementations, for the identified privilege violation fault, the prevention logic and/or circuitry in the fault circuitry with prevention logic and/or circuitry 340 may force a long page table walk to a memory address stored in a register (a "memory address register"). That is, the prevention logic and/or circuitry may initiate processing associated with a TLB miss (a "forced TLB miss"). This may include, but is not limited to, re-walking the page tables and reloading a TBL entry. Upon completion of the forced long page table walk, the fault circuitry with prevention logic and/or circuitry 340 or operating system may then report the privilege violation fault. In implementations, this processing is applicable to a TLB hit or a TLB miss for the memory request. In the event of a TLB hit, the processing may perform as described herein. In the event of a true or real TLB miss as opposed to the forced TLB miss, the prevention logic and/or circuitry may check whether the page table walk resulting from the real TLB miss meets or exceeds a page table walk latency value stored in a register (a "page table walk latency register") before initiating the forced TLB miss. In the event the page table walk latency value is not met, additional delay may be added using a counter as described herein or by using the forced TLB miss. In implementations, the memory address register may be updated with a new memory address if the page table walk latency associated with the true TLB miss is longer than the page table walk latency of the memory addressed stored in the memory address register. In implementations, a value in the register may be defined based on historical data. In implementations, a value in the register may be configurable. In implementations, a value in the register may be updated based on a longer value for a page table walk latency associated with a true TLB.

Figure 4:
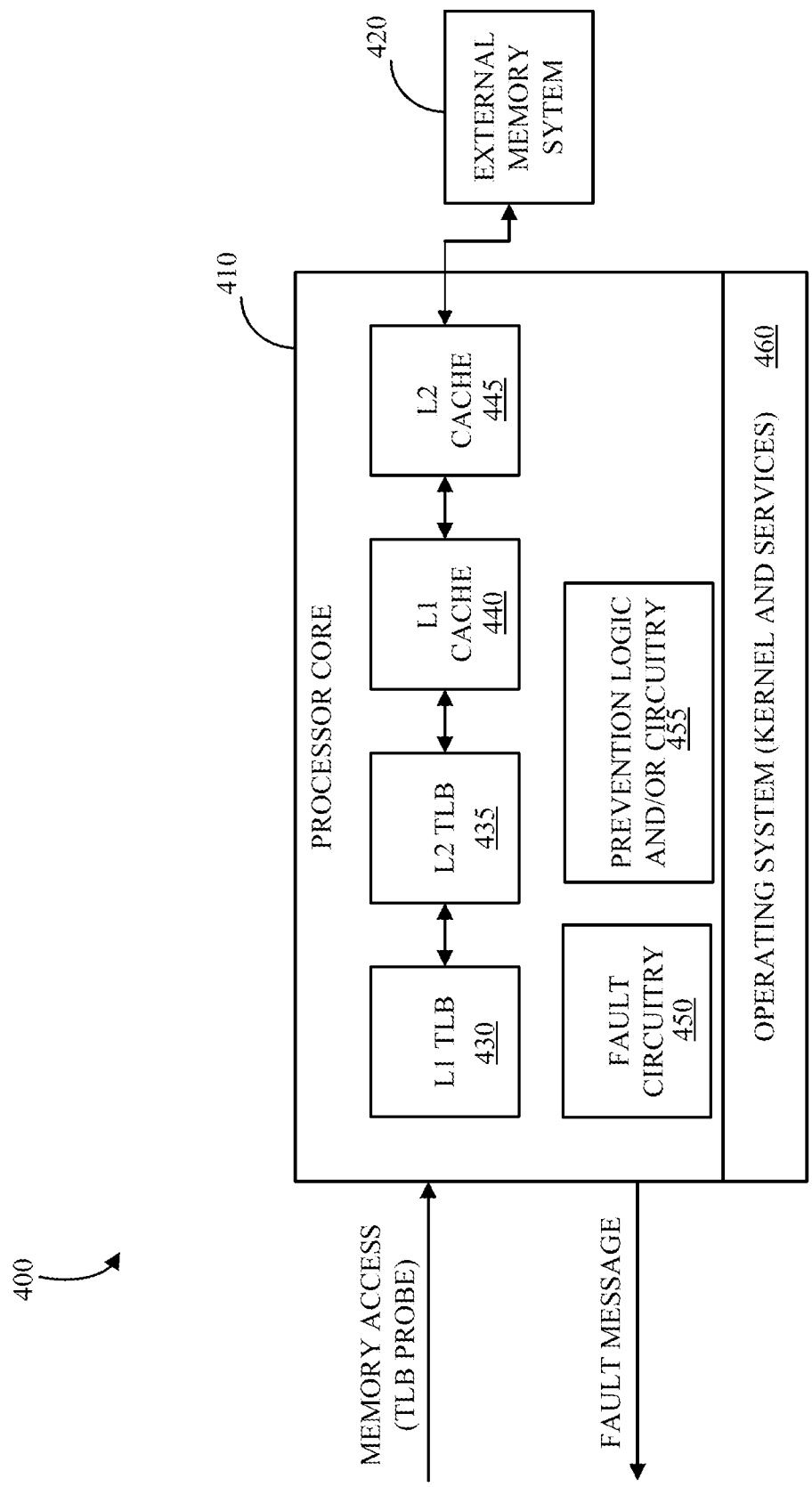
FIG. 4 is a block diagram of example of a processor with fault circuitry with prevention logic and/or circuitry.

FIG. 4 is a block diagram of a system 400 including a processor core 410 and an external memory system 420. The processor core 410 may include a L1 TLB 430, a L2 TLB 435, a L1 cache 440, a L2 cache 445, a fault circuitry 450, a prevention logic and/or circuitry 455, and an operating system 460 running on the processor core 410. The processor core 410 may be the processor core 330 of FIG. 3. The external memory system 420 may be the external memory system 322 of FIG. 3. The system 400 may be the system 300 of FIG. 3. The system 400 and each component in the system 400 is illustrative and can include additional, fewer, or different components which may be similarly or differently architected without departing from the scope of the specification and claims herein. Moreover, the illustrated components can perform other functions without departing from the scope of the specification and claims herein.

The L1 TLB 430 and the L2 TLB 435 are memory caches that store the recent translations of virtual memory to physical memory.

The L1 cache 440 and the L2 cache 445 store data and/or instructions so that future requests for that data and/or instructions can be served faster.

The fault circuitry 450 works with, is integrated with, or is associated with one or both of the L1 TLB 430 and the L2 TLB 435. The fault circuitry 450 may perform memory request processing including, but not limited to, determining whether a memory request is trying to access a privileged memory address. The fault circuitry 450, the operating system 460, and/or combinations thereof may report the privilege violation fault and take further actions or perform further memory request processing related to the privilege violation fault.

The prevention logic and/or circuitry 455 may prevent reporting a privileged memory violation for a defined period to obfuscate reporting times. The prevention logic and/or circuitry 455 may initiate a process to delay or wait the defined period. In implementations, the defined period may be a page table walk latency period or interval. In implementations, the prevention logic and/or circuitry 455 may use a forced page table walk, a counter or timer, and/or combinations thereof to implement the delay.

In implementations, the prevention logic and/or circuitry 455 may include or be a counter or timer. The counter or timer is initiated (i.e., the counter starts a countdown) as or when the memory request is being processed by the processor core 410. For a memory request that has been identified or marked as a privilege violation fault, the fault circuitry 450, the operating system 460, and/or combinations thereof may report the privilege violation fault upon completion or expiration of the counter or timer. In implementations, a value in the counter may be defined based on historical data. In implementations, a value in the counter may be configurable. In implementations, the value in the counter may be updated based on page table walks that are longer than the stored value. In implementations, a pseudo-random perturbation may be added to the value to add slight variations to the reporting intervals.

In implementations, for the identified privilege violation fault, the prevention logic and/or circuitry 455 may force a long page table walk to a memory address stored in a register (a "memory address register"). That is, the prevention logic and/or circuitry may initiate a forced TLB miss as described herein. The fault circuitry 450, the operating system 460, and/or combinations thereof may report the privilege violation fault upon completion of the forced long page table walk. In implementations, this processing is applicable to a TLB hit or a TLB miss for the memory request and may be processed as described herein with respect to FIG. 3.

Figure 5:
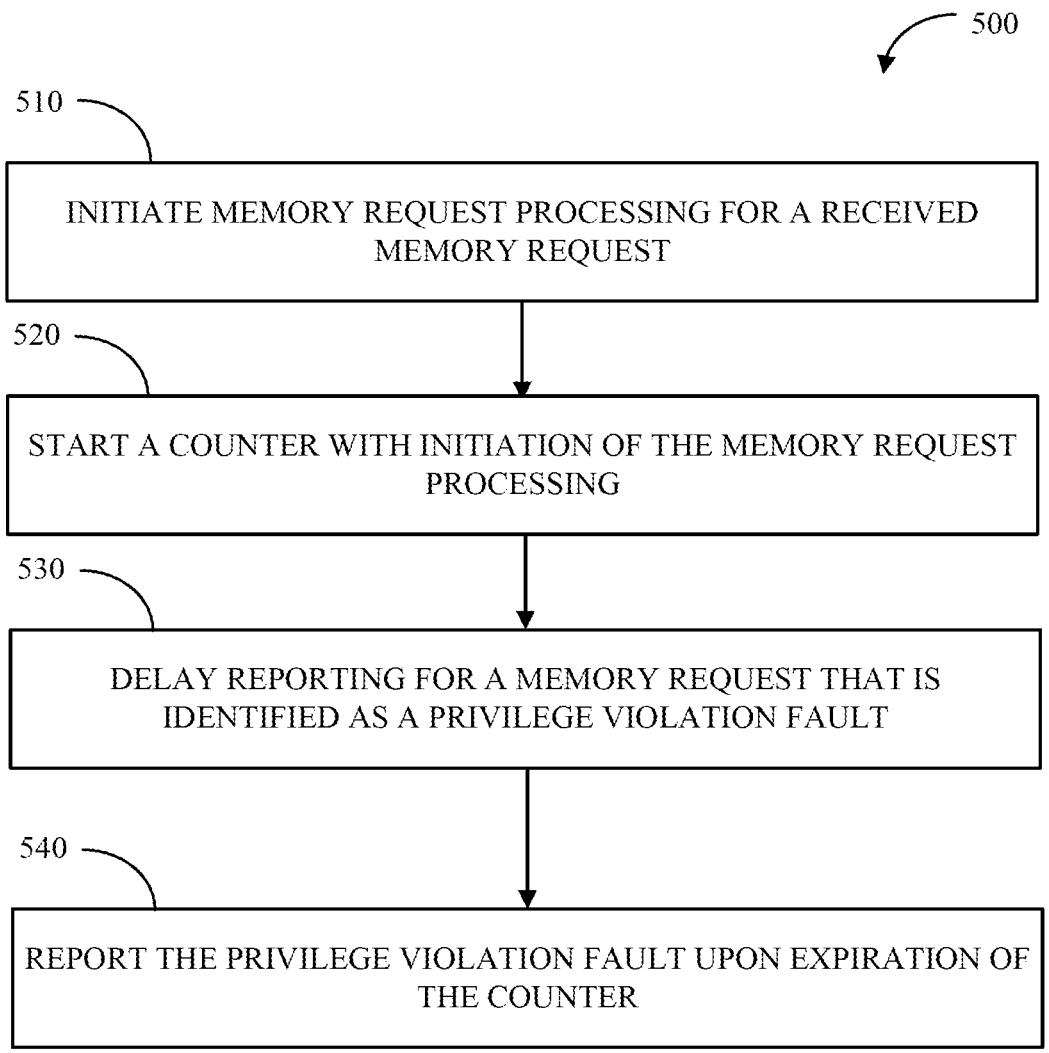
FIG. 5 is a flow chart of a method for preventing translation lookaside buffer probing.

FIG. 5 is a flow chart of an example of a process 500 for TLB probe prevention. The process 500 can be performed, for example, using the systems, hardware, and software described with respect to FIGS. 1-4. The steps, or operations, of the process 500 or another technique, method, process, or algorithm described in connection with the implementations disclosed herein can be implemented directly in hardware, firmware, software executed by hardware, circuitry, or a combination thereof. Further, for simplicity of explanation, although the figures and descriptions herein may include sequences or series of steps or stages, elements of the methods and claims disclosed herein may occur in various orders or concurrently and need not include all of the steps or stages. Additionally, elements of the methods and claims disclosed herein may occur with other elements not explicitly presented and described herein. Furthermore, not all elements of the methods and claims described herein may be required in accordance with this disclosure. Although aspects, features, and elements are described and claimed herein in particular combinations, each aspect, feature, or element may be used and claimed independently or in various combinations with or without other aspects, features, and elements.

At step 510, one or more TLBs and/or the processor may initiate memory request processing for a received memory request. A memory request may be sent as a result of an instruction being executed by the processor. The memory request may be a read request, a write request, a load operation, a store operation, and variations thereof.

At 520, a counter is initiated with initiation of the memory request processing. The counter is set with a defined value for a page table walk latency period. In implementations, the value in the counter may be defined based on historical data. In implementations, the value in the counter may be configurable. In implementations, the value in the counter may be updated based on page table walks that were performed for TLB misses or page faults and are longer than the stored value. In implementations, a pseudo-random perturbation may be added to the value to add slight variations to the reporting period.

At 530, reporting is delayed for a memory request that is identified as a privilege violation fault. The TLB and/or associated fault circuitry and/or logic may determine that the memory request is trying to access a privileged memory address which is where privileged code may be located. The fault circuitry and/or logic may delay reporting of the privilege violation fault until expiration of the counter.

At 540, the fault circuitry and/or logic and/or the operating system may report the privilege violation fault upon expiration of the counter. Once the counter has counted down or expired, the privilege violation fault may be reported out.

Figure 6:
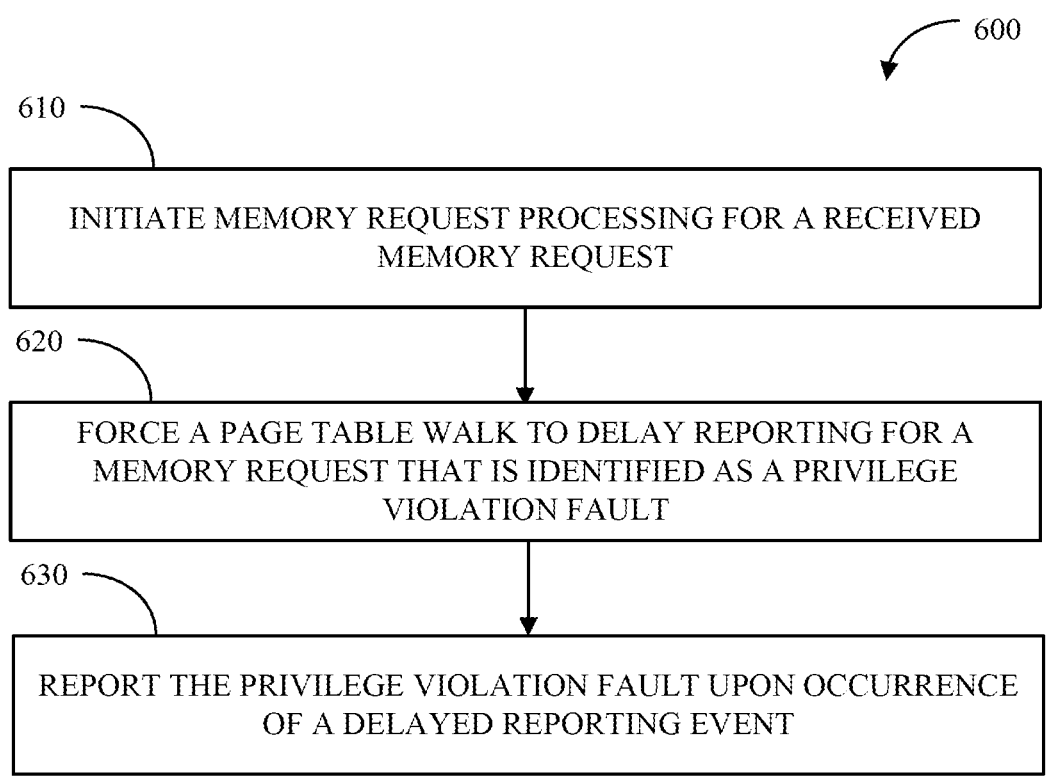
FIG. 6 is a flow chart of a method for preventing translation lookaside buffer probing.

FIG. 6 is a flow chart of an example of a process 600 for TLB probe prevention. The process 600 can be performed, for example, using the systems, hardware, and software described with respect to FIGS. 1-4. The steps, or operations, of the process 600 or another technique, method, process, or algorithm described in connection with the implementations disclosed herein can be implemented directly in hardware, firmware, software executed by hardware, circuitry, or a combination thereof. Further, for simplicity of explanation, although the figures and descriptions herein may include sequences or series of steps or stages, elements of the methods and claims disclosed herein may occur in various orders or concurrently and need not include all of the steps or stages. Additionally, elements of the methods and claims disclosed herein may occur with other elements not explicitly presented and described herein. Furthermore, not all elements of the methods and claims described herein may be required in accordance with this disclosure. Although aspects, features, and elements are described and claimed herein in particular combinations, each aspect, feature, or element may be used and claimed independently or in various combinations with or without other aspects, features, and elements.

At 610, one or more TLBs and/or the processor may initiate memory request processing for a received memory request. A memory request may be sent as a result of an instruction being executed by the processor. The memory request may be a read request, a write request, a load operation, a store operation, and variations thereof.

At 620, forcing a page table walk to delay reporting for a memory request that is identified as a privilege violation fault. The TLB and/or associated fault circuitry and/or logic may determine that the memory request is trying to access a privileged memory address which is where privileged code may be located. The fault circuitry and/or logic may delay reporting of the privilege violation fault by initiating a forced page table walk. The forced page table walk may use a memory address stored in a register. The register may be set and updated as described herein. In implementations, the memory request may be a TLB miss which results in initiation of a page table walk. In this event, the forced page table walk may not be performed to allow determination of whether a processing time associated with the TLB miss initiated page table walk meets or exceeds a page table walk latency period. A timer may be started when the page table walk due to the TLB is initiated to determine the processing time of the TLB miss initiated page table walk. In implementations, a counter countdown or a forced page table walk may be performed, as described herein, if the processing time associated with the TLB miss initiated page table walk is below the page table walk latency period.

At 630, the fault circuitry and/or logic and/or the operating system may report the privilege violation fault upon occurrence of a delayed reporting event. In implementations, the event may be completion of the forced page table walk, expiration of the counter, or completion of the TLB miss initiated page table walk, as appropriate.

Described herein are logic circuits, devices, and systems which prevent translation lookaside buffer probing. In implementations, an apparatus includes a processor core configured to initiate memory request processing for a received memory request; and a fault circuitry. The fault circuitry configured to start a counter when the memory request processing is initiated, wherein the counter is set with a page table walk latency value, delay reporting that the received memory request is a privilege violation fault, and report the privilege violation fault upon expiration of the counter.

In implementations, the page table walk latency value is at least hundreds of clock cycles. In implementations, the page table walk latency value is at least thousands of clock cycles. In implementations, the counter is updated when a page table walk time is greater than the page table walk latency value. In implementations, the fault circuitry is further configured to determine that the received memory request is attempting to access a privileged memory address resulting in the privilege violation fault. In implementations, the fault circuitry is further configured to determine that the received memory request is attempting to access memory associated with privileged code resulting in the privilege violation fault.

Described herein are methods which prevent translation lookaside buffer probing. In implementations, a method includes initiating memory request processing for a received memory request, starting a counter when the memory request processing is initiated, wherein the counter is set with a page table walk latency value; delaying reporting that the received memory request is a privilege violation fault, and reporting the privilege violation fault upon expiration of the counter.

In implementations, the page table walk latency value is at least hundreds of clock cycles. In implementations, the page table walk latency value is at least thousands of clock cycles. In implementations, the method further includes updating the counter when a page table walk time is greater than the page table walk latency value. In implementations, the method further includes determining that the received memory request is an attempt to access a privileged memory address which results in the privilege violation fault. In implementations, the method further includes determining that the received memory request is an attempt to access memory associated with privileged code which results in the privilege violation fault.

In implementations, a non-transitory computer readable medium comprising a circuit representation that, when processed by a computer, is used to program or manufacture an integrated circuit, includes a processor core configured to initiate memory request processing for a received memory request; and a fault circuitry. The fault circuitry configured to start a counter when the memory request processing is initiated, wherein the counter is set with a page table walk latency value, delay reporting that the received memory request is a privilege violation fault, and report the privilege violation fault upon expiration of the counter.

In implementations, the page table walk latency value is at least hundreds of clock cycles. In implementations, the page table walk latency value is at least thousands of clock cycles. In implementations, the counter is updated when a page table walk time is greater than the page table walk latency value. In implementations, the fault circuitry is further configured to determine that the received memory request is attempting to access a privileged memory address resulting in the privilege violation fault. In implementations, the fault circuitry is further configured to determine that the received memory request is attempting to access memory associated with privileged code resulting in the privilege violation fault.

Described herein are apparatus which prevent translation lookaside buffer probing. In implementations, the apparatus includes a processor core configured to initiate memory request processing for a received memory request; and a fault circuitry. The fault circuitry configured to force a page table walk to delay reporting that the memory request is identified as a privilege violation fault; and report the privilege violation fault upon completion of a delayed reporting event.

In implementations, the delayed reporting event is completion of the forced page table walk. In implementations, the forced page table walk uses a memory address stored in a register that has a processing time of a page table walk latency value. In implementations, the register is updated with a memory address for a page table walk having a time greater than a page table walk latency value, wherein the page table walk latency value is at least hundreds of clock cycles. In implementations, the page table walk latency value is at least hundreds of clock cycles. In implementations, the delayed reporting event is completion of a page table walk due to a translation lookaside buffer miss. In implementations, a time associated with the page table walk due to the translation lookaside buffer miss meets or exceeds a page table walk latency value. In implementations, the page table walk latency value is at least hundreds of clock cycles. In implementations, the delayed reporting event is expiration of a counter initiated when a page table walk due to a translation lookaside buffer miss is less than a page table walk latency value. In implementations, the page table walk latency value is at least hundreds of clock cycles.

Described herein are methods which prevent translation lookaside buffer probing. In implementations, a method includes initiating memory request processing for a received memory request, forcing a page table walk to delay reporting that the memory request is identified as a privilege violation fault; and reporting the privilege violation fault upon completion of a delayed reporting event.

In implementations, the delayed reporting event is completion of the forced page table walk. In implementations, the forced page table walk uses a memory address stored in a register that has a processing time of a page table walk latency value. In implementations, the method further includes updating the register with a memory address for a page table walk having a time greater than a page table walk latency value, wherein the page table walk latency value is at least hundreds of clock cycles. In implementations, the page table walk latency value is at least hundreds of clock cycles. In implementations, the delayed reporting event is completion of a page table walk due to a translation lookaside buffer miss. In implementations, a time associated with the page table walk due to the translation lookaside buffer miss meets or exceeds a page table walk latency value. In implementations, the page table walk latency value is at least hundreds of clock cycles. In implementations, the delayed reporting event is expiration of a counter initiated when a page table walk due to a translation lookaside buffer miss is less than a page table walk latency value. In implementations, the page table walk latency value is at least hundreds of clock cycles.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures.

What is claimed is:

1. An apparatus comprising:
   a processor core configured to initiate memory request processing for a received memory request; and
   a fault circuitry configured to:
      start a counter when the memory request processing is initiated, wherein the counter is set with a page table walk latency value;
      delay reporting that the received memory request is a privilege violation fault; and
      report the privilege violation fault upon expiration of the counter.

2. The apparatus of claim 1, wherein the page table walk latency value is at least hundreds of clock cycles.

3. The apparatus of claim 1, wherein the page table walk latency value is at least thousands of clock cycles.

4. The apparatus of claim 1, wherein the counter is updated when a page table walk time is greater than the page table walk latency value.

5. The apparatus of claim 1, wherein the fault circuitry is further configured to: determine that the received memory request is attempting to access a privileged memory address resulting in the privilege violation fault.

6. The apparatus of claim 1, wherein the fault circuitry is further configured to: determine that the received memory request is attempting to access memory associated with privileged code resulting in the privilege violation fault.

7. A method comprising:
   initiating memory request processing for a received memory request;
   starting a counter when the memory request processing is initiated, wherein the counter is set with a page table walk latency value;
   delaying reporting that the received memory request is a privilege violation fault; and
   reporting the privilege violation fault upon expiration of the counter.

8. The method of claim 7, wherein the page table walk latency value is at least hundreds of clock cycles.

9. The method of claim 7, wherein the page table walk latency value is at least thousands of clock cycles.

10. The method of claim 7, the method further comprising:
    updating the counter when a page table walk time is greater than the page table walk latency value.

11. The method of claim 7, the method further comprising:
    determining that the received memory request is an attempt to access a privileged memory address which results in the privilege violation fault.

12. The method of claim 7, the method further comprising:
    determining that the received memory request is an attempt to access memory associated with privileged code which results in the privilege violation fault.

13. An apparatus comprising:
    a processor core configured to initiate memory request processing for a received memory request; and
    a fault circuitry configured to:
       force a page table walk to delay reporting that the memory request is identified as a privilege violation fault; and report the privilege violation fault upon completion of a delayed reporting event.

14. The apparatus of claim 13, wherein the delayed reporting event is completion of the forced page table walk.

15. The apparatus of claim 13, wherein the forced page table walk uses a memory address stored in a register that has a processing time of a page table walk latency value.

16. The apparatus of claim 15, wherein the register is updated with a memory address for a page table walk having a time greater than a page table walk latency value, wherein the page table walk latency value is at least hundreds of clock cycles.

17. The apparatus of claim 16, wherein the page table walk latency value is at least hundreds of clock cycles.

18. The apparatus of claim 13, wherein the delayed reporting event is completion of a page table walk due to a translation lookaside buffer miss.

19. The apparatus of claim 18, wherein a time associated with the page table walk due to the translation lookaside buffer miss meets or exceeds a page table walk latency value.

20. The apparatus of claim 13, wherein the delayed reporting event is expiration of a counter initiated when a page table walk due to a translation lookaside buffer miss is less than a page table walk latency value.

* * * * *